US008849816B2

(12) United States Patent
Burba et al.

(10) Patent No.: US 8,849,816 B2
(45) Date of Patent: Sep. 30, 2014

(54) PERSONALIZED MEDIA CHARTS (75) Inventors: Alexander Burba, Seattle, WA (US); Ismet E. Kahraman, Seattle, WA (US); Ivan P. Trindev, Issaquah, WA (US); Zerelina R. Mukherjee, Redmond, WA (US); Chad C. Gibson, Seattle, WA (US); Thomas C. Butcher, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 687 days.

(21) Appl. No.: 12/820,360

(22) Filed: Jun. 22, 2010

(65) Prior Publication Data

US 2011/0314030 A1 Dec. 22, 2011

(51) Int. Cl.
G06F 17/30 (2006.01)
(52) U.S. Cl.
CPC .... G06F 17/30867 (2013.01); G06F 17/30053 (2013.01); G06F 17/30029 (2013.01)
USPC ............ 707/732; 707/737; 707/748; 707/752
(58) Field of Classification Search
None
See application file for complete search history.

(56) References Cited

U.S. PATENT DOCUMENTS

| | | |
|---|---|---|
| 2006/0218153 A1 | 9/2006 | Voon et al. |
| 2006/0242139 A1* | 10/2006 | Butterfield et al. ............... 707/5 |
| 2007/0198510 A1 | 8/2007 | Ebanks |
| 2007/0219985 A1 | 9/2007 | Aravamudan et al. |
| 2007/0219994 A1 | 9/2007 | Lemelson |
| 2007/0239788 A1* | 10/2007 | Cunningham et al. ..... 707/104.1 |
| 2008/0040474 A1 | 2/2008 | Zuckerberg et al. |
| 2008/0092054 A1 | 4/2008 | Bhumkar et al. |
| 2008/0114750 A1* | 5/2008 | Saxena et al. ...................... 707/5 |
| 2008/0154626 A1* | 6/2008 | Gounares et al. .................. 705/1 |
| 2008/0195657 A1* | 8/2008 | Naaman et al. ............ 707/104.1 |
| 2009/0070438 A1* | 3/2009 | Bartholomew ............... 709/219 |
| 2009/0132520 A1* | 5/2009 | Nemeth et al. ................... 707/5 |
| 2009/0148124 A1* | 6/2009 | Athsani et al. .................. 386/46 |
| 2009/0216741 A1* | 8/2009 | Thrall et al. ....................... 707/5 |
| 2009/0265426 A1 | 10/2009 | Svendsen et al. |
| 2010/0070862 A1* | 3/2010 | Partovi et al. ................. 715/716 |
| 2011/0295661 A1* | 12/2011 | Dodge et al. ................. 705/14.4 |

OTHER PUBLICATIONS

Smith, et al., "Leveraging Social Context for Searching Social Media", Retrieved at <<http://waimea.cs.umd.edu:8080/basilic/web/Publications/2008/smith:cikm07-ssm/smith-cikm07-ssm.pdf >>, Conference on Information and Knowledge Management, Proceeding of the 2008 ACM workshop on Search in social media, Oct. 30, 2008, pp. 4.

* cited by examiner

Primary Examiner — Mohammad S Rostami
(74) Attorney, Agent, or Firm — Bryan Webster; Andrew Sanders; Micky Minhas (57) ABSTRACT Personalized media charts are described. In embodiments, a request can be received for a personalized media chart that lists media assets as recommendations in a relevant order for a user. The media assets are initially ordered in the personalized media chart according to a chart rank for each media asset. A relevance factor is then determined for each of the media assets, where the relevance factor for a media asset indicates a relevance of the media asset to the user. A chart rank adjustment is calculated for each of the media assets based on the relevance factors for each of the media assets, and the media assets are then reordered in the personalized media chart according to the chart rank adjustments for each of the media assets.

20 Claims, 6 Drawing Sheets

PERSONALIZED MEDIA CHARTS

BACKGROUND

Ranked charts of movies and music, for example, are often used to discover new and/or popular media content. Typically, charts and other media lists include the current popular choices based on the common selections and downloads of a large number of users. These charts and media lists may also include many items that are not of interest or are irrelevant to a user. Generally, if a recommendation list includes too many items that are not of interest, a requesting user may form the impression that a particular list or recommendation service is too different from the interests of the user, and the person may discontinue using the recommendation service and/or look elsewhere.

SUMMARY

This summary is provided to introduce simplified concepts of personalized media charts that are further described below in the Detailed Description. This summary is not intended to identify essential features of the claimed subject matter, nor is it intended for use in determining the scope of the claimed subject matter.

Personalized media charts are described. In embodiments, a request can be received for a personalized media chart that lists media assets as recommendations in a relevant order for a user. The media assets are initially ordered in the personalized media chart according to a chart rank for each media asset. A relevance factor is then determined for each of the media assets, where the relevance factor for a media asset indicates a relevance of the media asset to the user. A chart rank adjustment is calculated for each of the media assets based on the relevance factors for each of the media assets, and the media assets are then reordered in the personalized media chart according to the chart rank adjustments for each of the media assets.

In other embodiments, the chart rank adjustment for a media asset can be an increase based on the relevance factor that corresponds to the media asset, or the chart rank adjustment can be a decrease based on the relevance factor that corresponds to the media asset. The relevance factor for a media asset can be determined based on a personal context of the media asset to the user, such as determined from user preferences, a history of media asset selections, or media asset metadata. Alternatively or in addition, the relevance factor for a media asset can be determined based on a social context of the media asset to social contacts that are associated with the user.

In embodiments, the social contacts that are associated with the user may have indicated a dislike for the media asset, or similar media assets, which decreases the relevance of the media asset to the user. Alternatively, the social contacts that are associated with the user may have indicated liking the media asset which increases the relevance of the media asset to the user. Additionally, the relevance of the media asset to the user may further increase if the user has not selected the media asset for playback. Alternatively, the relevance of the media asset to the user may decrease if the user has selected the media asset or a related media asset for playback.

BRIEF DESCRIPTION OF THE DRAWINGS

Embodiments of personalized media charts are described with reference to the following drawings. The same numbers are used throughout the drawings to reference like features and components.

DETAILED DESCRIPTION

Personalized media charts are described. In embodiments, a personalized media chart can be generated when a user requests recommendations for media assets, such as movies or music tracks. A personalized media chart includes media assets that are listed as recommendations in a relevant order for the user. In an embodiment, the media assets that are listed in the personalized media chart are the media assets that have the most personal and/or social relevance to the user at the particular time that the personalized media chart is generated. Alternatively or in addition, the media assets that are listed in the personalized media chart are the media assets that have a personal and/or social relevance to the user based on a current location of the user. For example, the user may be near a movie theatre and the media assets that are relevant to the user are the movies currently available for viewing in the particular theatre. The relevance of a media asset to a user can be based on personal and/or social contexts of the media asset to influence the relevance of the media asset, as well as to generate a new media group that is relevant to the person.

The order that media assets are listed in a personalized media chart can be adjusted based on several factors. For example, media assets can be promoted or moved up (e.g., attributed with more relevance) when friends of a user show interest and/or indicate a likeness for a media asset, or some aspect of the media asset. Alternatively, media assets can be penalized or moved down (e.g., attributed with less relevance) when friends of the user show explicit or implicit dislike for a media asset, or some aspect of the media asset. Similar relevance determinations and adjustments can be extended to a broader social circle, such as to friends of the friends, and so on.

While features and concepts of the described systems and methods for personalized media charts can be implemented in any number of different environments, systems, and/or various configurations, embodiments of personalized media charts are described in the context of the following example systems and environments.

Figure 1:
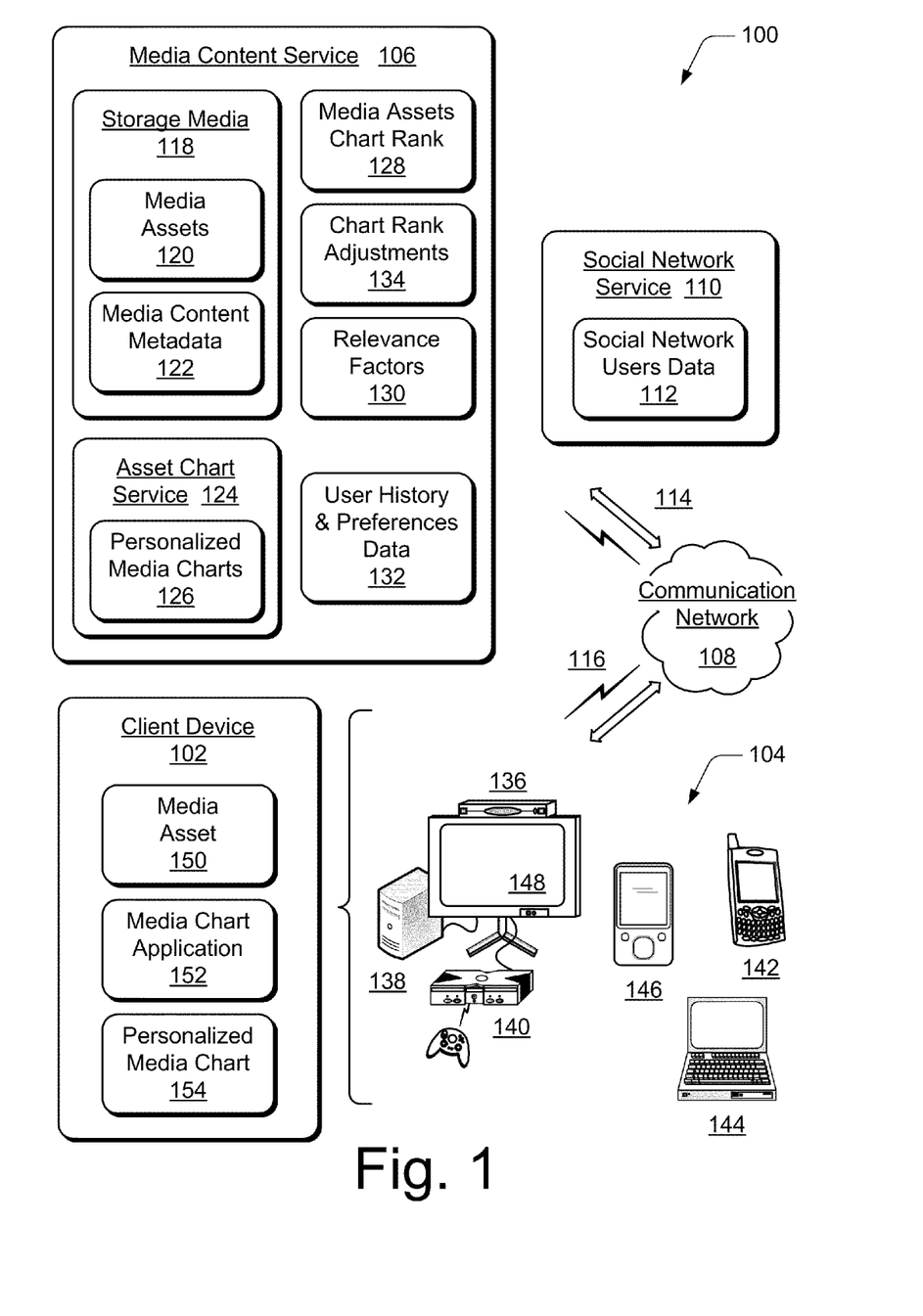
FIG. 1 illustrates an example system in which embodiments of personalized media charts can be implemented.

FIG. 1 illustrates an example system 100 in which various embodiments of personalized media charts can be implemented. The example system 100 includes a client device 102, which may be configured as any type of client device 104. Some of the various client devices 104 include wired and/or wireless devices, and may also be referred to as user devices and/or portable devices. The example system 100 also includes a media content service 106 and/or other media content sources that communicate or otherwise provide media content and data to any number of the various client devices 104 via a communication network 108.

The example system 100 also includes a social network service 110 that supports social networking by users of the various client devices. The social network service 110 may be implemented as any type of social network site that provides for social network contacts based on any one or combination of social groups, such as co-workers, friends, family, a group based on common interests, a group of unknown contacts that are linked based on some commonality, and so on. The social network service 110 supports social networking by maintaining social network users data 112 that corresponds to social network users of the various client devices.

Social network users can be associated with a user of the client device 102, and can utilize the social network service 110 to share media content, upload photos, share URL links, provide status updates, generate blogs, and any other type of social networking with audio, video, and/or image content. The social network service 110 may use a permissioning technique, such as a selected or allowed relationship, to permit or restrict access to content associated with a user account of the social network service. For example, a user of the client device 102 may have an associated user account with the social network service 110, and via the client device 102, the user can select and allow social network contacts of the user.

The communication network 108 can be implemented to include a broadcast network, an IP-based network 114, and/or a wireless network 116 that facilitates media asset distribution and data communication between the media content service 106, the social network service 110, and any number of the various client devices. The communication network 108 can also be implemented using any type of network topology and/or communication protocol, and can be represented or otherwise implemented as a combination of two or more networks. The communication network 108 may also include a mobile operator network that is managed by a communication service provider, such as a cell-phone provider and/or Internet service provider, to facilitate mobile data and/or voice communications for any type of a wireless device or mobile phone (e.g., cellular, VoIP, Wi-Fi, etc.).

The media content service 106 can include media content servers to communicate, or otherwise distribute, media content and/or other data to any number of the various client devices. In this example system 100, the media content service 106 includes storage media 118 to store or otherwise maintain various media content and data, such as media assets 120 and media content metadata 122. The storage media 118 can be implemented as any type of memory and/or suitable electronic data storage. Additionally, the media content service 106 may be implemented as a subscription-based service from which any of the various client devices 104 can request media assets 120, or recommendations of media assets, to download and display for viewing, or otherwise render for playback. The media content service 106 manages the media asset distribution to the various client devices 104, such as when a request for a media asset 120 is received from a client device 104, and the media content service 106 communicates or provides data segments of the media asset to the client device.

The media assets 120 can include any type of audio, video, and/or image data received from any type of media content source or data source. As described throughout, media assets are media content, and media assets can include music (e.g., digital music files of songs), television programming, movies, on-demand media assets, interactive games, network-based applications, and any other audio, video, and/or image data (e.g., to include program guide data, user interface data, advertising content, closed captions data, content metadata, search results and/or recommendations, etc.). A media asset 120 may also include or correspond to any one of actors, performers, bands, musical artists, and the like. A media asset 120 may also include various display formats of the media asset, such as a high-definition display format and lower quality display formats.

The media content metadata 122 can include any type of identifying criteria, descriptive information, and/or attributes associated with the media assets 120 that describes and/or categorizes the media assets. For example, metadata can include a media asset identifier, title, subject description, a date of production, artistic information, music compilations, actors, performers, musicians, band names, and any other types of descriptive information about a particular media asset. Further, metadata can characterize a genre that describes a media asset, such as video content, as being an advertisement, a movie, a comedy show, a sporting event, a news program, a sitcom, a talk show, an action/adventure program, a music track, a music video, a music album, or as any number of other category descriptions.

In this example system 100, the media content service 106 includes an asset chart service 124 that can be implemented as computer-executable instructions and executed by one or more processors to implement the various embodiments described herein for personalized media charts. The media content service 106 can also be implemented with any number and combination of differing components as further described with reference to the example device shown in FIG. 6. Additionally, any of the media content service 106, the social network service 110, and the asset chart service 124 may be implemented as an independent service (e.g., on a separate server or by a third party service), or as one combined service.

The media content service 106 can receive a request for a personalized media chart that lists media assets as recommendations in a relevant order for a user. For example, a user of the client device 102 can request recommendations for media assets, such as movies, television programs, and/or music, and the client device 102 communicates the request to the media content service. In various embodiments, the asset chart service 124 is implemented to then generate a personalized media chart 126 for the user, where the personalized media chart includes a list of media asset recommendations. Initially, the media assets 120 can be ranked in a chart (e.g., a non-personalized media chart) according to a chart rank 128 for each asset. For example, the media assets may be ranked in order by popularity or by some other basis for chart rank to recommend media assets when requested. A non-personalized media chart may initially include media assets that are selected or recommended based on data that is averaged across multiple users.

The asset chart service 124 can then determine a relevance factor 130 for each of the media assets 120, where the relevance factor for a media asset indicates a relevance of the media asset to the user that requests the media asset recommendations. The relevance factor 130 for a media asset 120 can be determined based on a personal context of the media asset to the user, such as determined from user preferences and/or a history of media asset selections (e.g., user history and preferences data 132), or media asset metadata. A personal adjustment can also be computed for each media asset in a media asset chart, such as for music tracks that are adjusted based on personal artist preferences, genre preferences, how many times a particular music track has been downloaded and/or played by the user, etc.

Alternatively or in addition, a relevance factor 130 for a media asset 120 can be determined based on a social context of the media asset to social contacts that are associated with the user, such as social network contacts that are identified by the social network users data 112 at the social network service 110. For example, a social adjustment may be determined based on how many friends of the user listen to a particular music artist and/or to a particular music track, or have shared a particular music track with other friends. Complex social scenarios may also be applied to the media assets, such as to determine several friends of the user that have similar music preferences, and additionally, broad social category preferences can be computed.

In embodiments, the social contacts that are associated with a user may have indicated a dislike for a media asset, or similar media assets, which can decrease the relevance of the media asset to the user. For example, the user may associate with a group of friends that have indicated a dislike for a new movie or new music that has recently been released. Alternatively or in addition, the group of friends may have indicated a dislike for other movies related to the new movie, or an actor that is starring in the new and related movies. The group of friends may also have indicated a dislike for other music performed by the artist or music group that performs the new music. If the group of friends do not like the movie or the music, then the user also may not like the new movie or music. Alternatively, the social contacts that are associated with the user may have indicated liking the media asset which can increase the relevance of the media asset to the user. For example, if the group of friends have watched and liked the movie, or like the new music, then the user also may like the movie and/or the music.

Additionally, the relevance of a media asset to the user may further increase if the user has not selected the media asset for playback. For example, the user may not yet have seen, or even heard of the new movie, and if the group of friends liked the movie, then the relevance to the user may be further increased. Alternatively, the relevance of the media asset to the user may decrease if the user has selected the media asset or a related media asset for playback. For example, the user may have already selected the movie to watch (e.g., downloaded the movie for viewing), or the user may have watched a similar or related movie and indicated a dislike for the particular genre of movies.

The asset chart service 124 is implemented to calculate a chart rank adjustment 134 for each of the media assets 120 for a recommendation based on the relevance factors 130 for each of the media assets. When the relevance factors that are based on the personal and social contexts are determined, weighting factors can be applied to each of the media assets to adjust a personalized media chart. For example, a music track that is performed by a favorite artist of the user may be increased in chart rank so as to move up in the personalized media chart. In an implementation, the following chart rank equation can be applied by the asset chart service 124 to determine the chart rank adjustments 134 for each of the media assets in a personalized media chart:

$$\text{Personalized Chart Rank} = \text{Chart Rank} * \prod_{all\ adjustments} (1 + \text{adjsutment type maximum weight} * \text{adjustment})$$

The asset chart service 124 can then reorder the media assets in the personalized media chart 126 according to the chart rank adjustments 134 for each of the media assets. An example of a personalized media chart being generated by the asset chart service 124 is described below with reference to FIG. 2.

In the example system 100, a client device 104 can be implemented as any one or combination of a television client device 136 (e.g., a television set-top box, a digital video recorder (DVR), etc.), a computer device 138, a gaming system 140, an appliance device, an electronic device, and/or as any other type of client device or user device that may be implemented to receive media content in any form of audio, video, and/or image data. The various client devices 104 can also include wireless devices implemented to receive and/or communicate wireless data, such as any one or combination of a mobile phone 142 (e.g., cellular, VoIP, WiFi, etc.), a portable computer device 144, a media device 146 (e.g., a personal media player, portable media player, etc.), and/or any other wireless device that can receive media content in any form of audio, video, and/or image data. A client system can include a respective client device and display device 148 that together render or playback any form of audio, video, and/or image media content and media assets. The display device 148 can be implemented as any type of a television, high definition television (HDTV), LCD, or similar display system.

Any of the various client devices 104 can be configured as the client device 102 and implemented with one or more processors, communication components, memory components, signal processing and control circuits, and a media content rendering system. Further, any of the client devices 104 can be implemented with any number and combination of differing components as further described with reference to the example device shown in FIG. 6. The example client device 102 can receive and playback a media asset 150 from the media content service 106 or from any other media content source. The client device 102 can include a media chart application 152 that is implemented to communicate a request for a personalized media chart to the media content service 106, and receive the personalized media chart 154 when initiated by a user at the client device.

Figure 2:
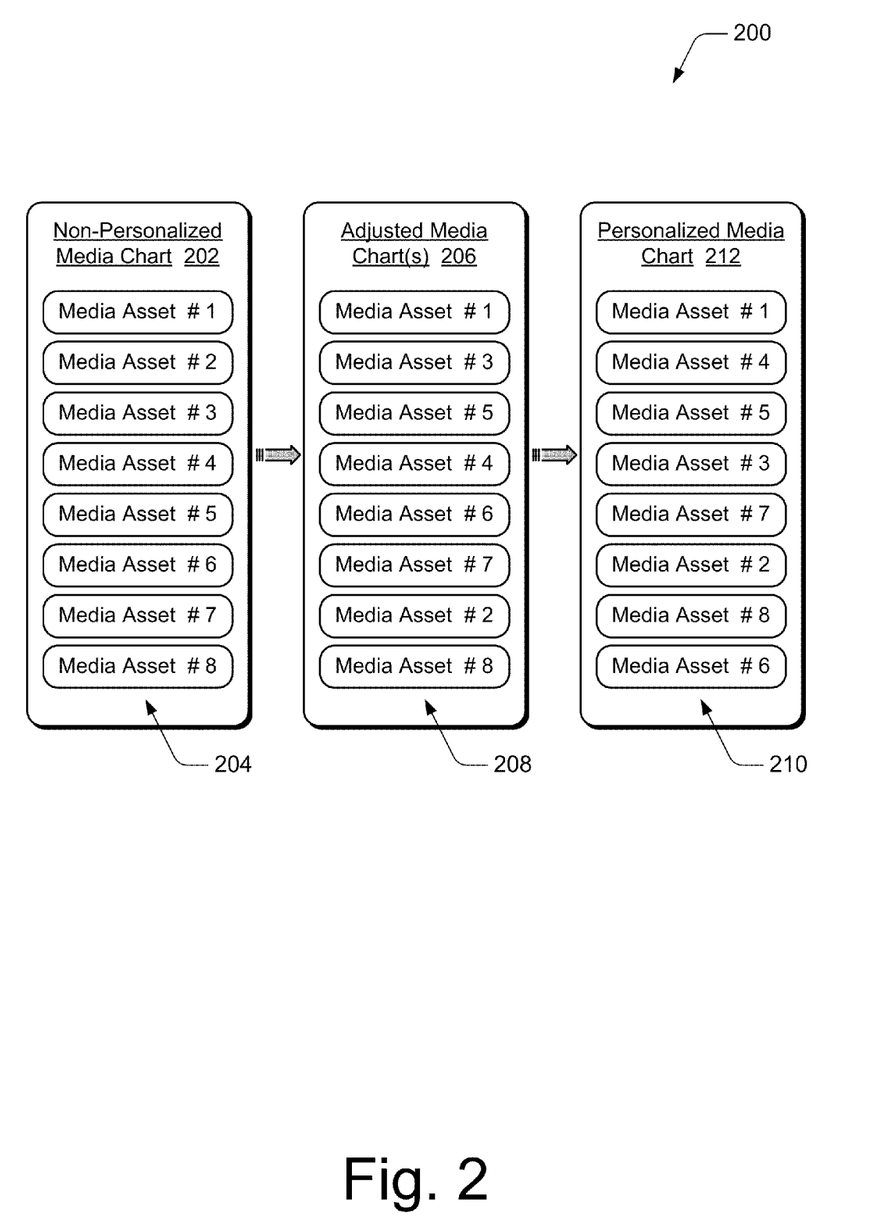
FIG. 2 illustrates an example personalized media chart in accordance with one or more embodiments.

FIG. 2 illustrates an example 200 of generating a personalized media chart in accordance with the various embodiments described herein. A non-personalized media chart 202 includes several media assets 204 that may be ordered by popularity, such as when the media content service 106 initially receives a request for a personalized media chart. The media assets 204 are initially ordered in the non-personalized media chart according to a chart rank for each media asset. In this example, the non-personalized media chart includes eight media assets (i.e., identified as media assets #1-8). One or more adjusted media charts 206 include the media assets 204 reordered and/or adjusted based on various adjustments, such as based on a personal context of the media assets 204 to a user and/or based on social contexts of the media assets to the user.

As described above with reference to FIG. 1, the personal context of the media assets 204 to the user may be determined from user preferences and/or a history of media asset selections (e.g., user history and preferences data 132). The media assets 204 (i.e., identified as media assets #1-8) are reordered at 208 based on chart rank adjustments to the order of the media assets in the adjusted media chart 206. For example, media asset #5 may be determined to have more personal relevance to the user and is moved up in the chart, while the more popular media asset #2 may be determined to have less personal relevance to the user and is moved down in the chart.

Also as described above with reference to FIG. 1, the social contexts of the media assets 204 to the user can be determined based on social contacts that are associated with the user, such as a group of friends or social networking group. The media assets 204 (i.e., identified as media assets #1-8) are again reordered at 210 based on additional chart rank adjustments to the order of the media assets in a personalized media chart 212. For example, media asset #4 may be determined to have more social relevance to the user and is moved up in the chart, while media asset #6 may be determined to have less social relevance to the user and is moved down in the personalized media chart. The personalized media chart 212 is an example of a personalized media chart 126 described with reference to FIG. 1.

Figure 3:
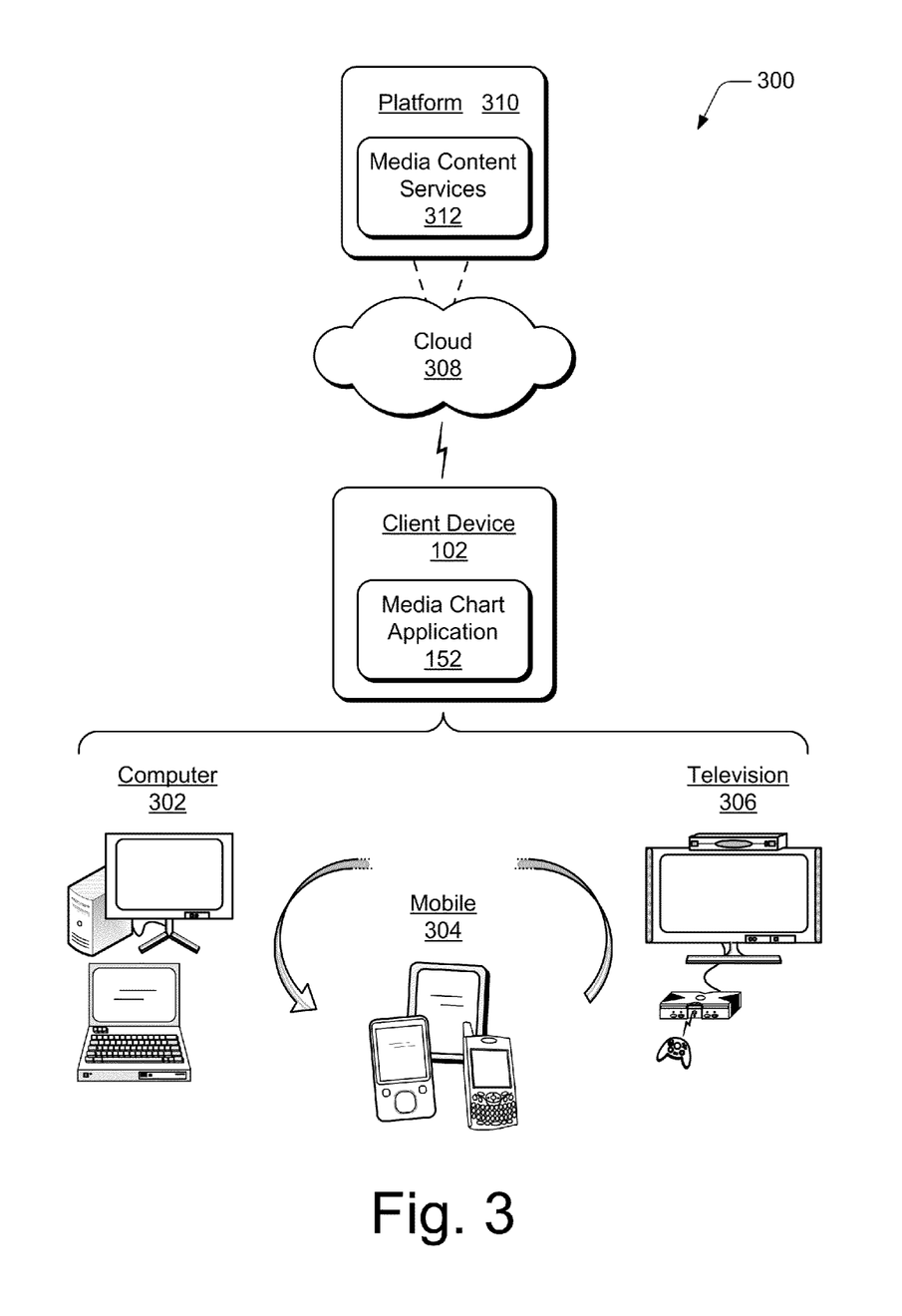
FIG. 3 illustrates an example system with multiple devices that can implement various embodiments of personalized media charts for a seamless user experience in ubiquitous environments.

FIG. 3 illustrates an example system 300 that includes the client device 102 as described with reference to FIG. 1. The example system 300 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 300, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the client device 102 may assume a variety of different configurations, such as for computer 302, mobile 304, and television 306 uses. Each of these configurations includes devices that may have generally different constructs and capabilities, and thus the client device 102 may be configured according to one or more of the different device classes. For instance, the client device 102 may be implemented as the computer 302 class of device that includes a personal computer, desktop computer, a multi-screen computer, laptop computer, netbook, and so on.

The client device 102 may also be implemented as the mobile 304 class of device that includes mobile devices, such as a mobile phone, portable music player, portable gaming device, a tablet computer, a multi-screen computer, and so on. The client device 102 may also be implemented as the television 306 class of device that includes devices having or connected to generally larger screens in casual viewing environments. These devices include televisions, set-top boxes, gaming consoles, and so on. The techniques described herein may be supported by these various configurations of the client device 102 and are not limited to the specific examples of personalized media charts described herein.

The cloud 308 includes and/or is representative of a platform 310 for media content services 312. The platform 310 abstracts underlying functionality of hardware (e.g., servers) and software resources of the cloud 308. The media content services 312 may include applications and/or data that can be utilized while computer processing is executed on servers that are remote from the client device 102. For example, the media content services 312 may include the media content service 106 and/or the social network service 110 as described with reference to FIG. 1. Media content services 312 can be provided as a service over the Internet and/or through a subscriber network, such as a cellular or WiFi network.

The platform 310 may abstract resources and functions to connect the client device 102 with other computing devices. The platform 310 may also serve to abstract scaling of resources to provide a corresponding level of scale to encountered demand for the media content services 312 that are implemented via the platform 310. Accordingly, in an interconnected device embodiment, implementation of functionality of the media chart application 152 may be distributed throughout the system 300. For example, the media chart application 152 may be implemented in part on the client device 102 as well as via the platform 310 that abstracts the functionality of the cloud 308.

Example methods 400 and 500 are described with reference to respective FIGS. 4 and 5 in accordance with one or more embodiments of personalized media charts. Generally, any of the functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computer devices. Further, the features described herein are platform-independent and can be implemented on a variety of computing platforms having a variety of processors.

Figure 4:
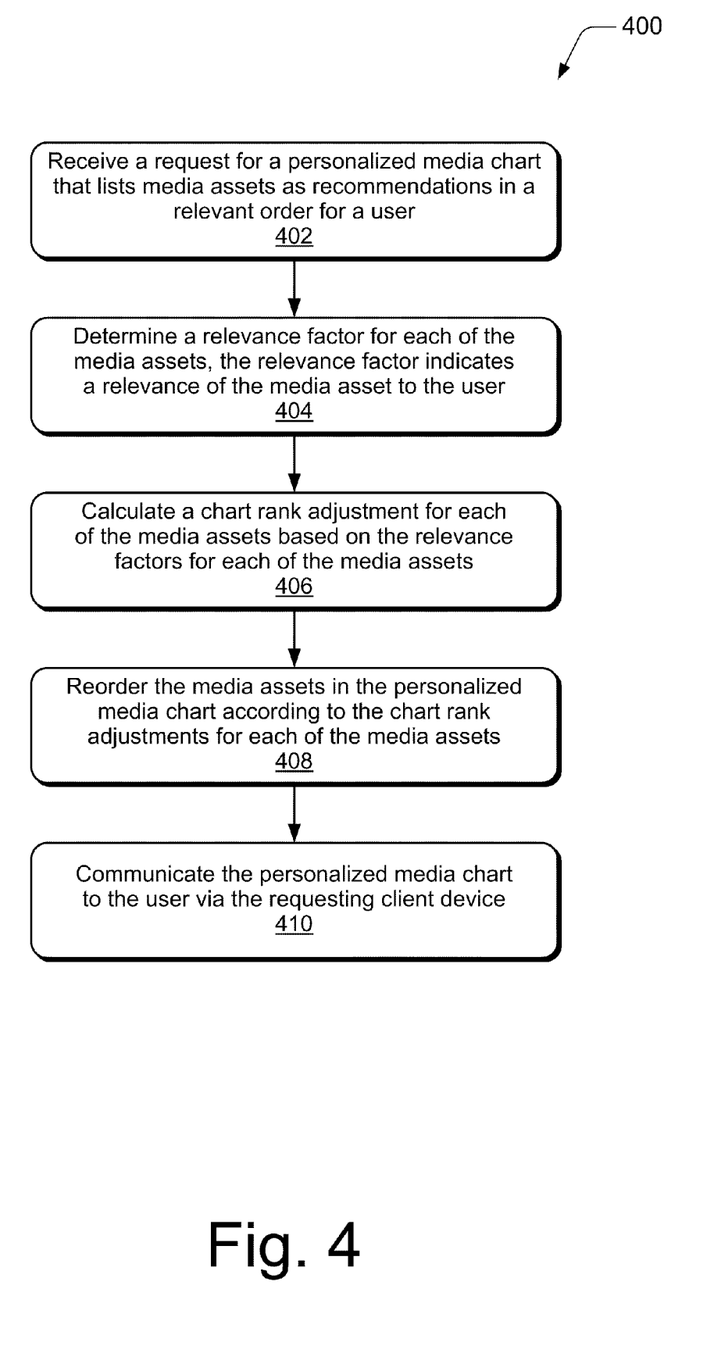
FIG. 4 illustrates example method(s) of personalized media charts in accordance with one or more embodiments.

FIG. 4 illustrates example method(s) 400 of personalized media charts. The order in which the method blocks are described are not intended to be construed as a limitation, and any number of the described method blocks can be combined in any order to implement a method, or an alternate method.

At block 402, a request is received for a personalized media chart that lists media assets as recommendations in a relevant order for a user. For example, the media content service 106 (FIG. 1) receives a request from a user, via the client device 102, for a personalized media chart. Initially, the media assets can be ranked in the non-personalized media chart 202 (FIG. 2) according to a chart rank 128 for each asset. For example, the media assets may be ranked in order by popularity or by some other chart rank basis, such as media assets selected based on data that is averaged across multiple users.

At block 404, a relevance factor is determined for each of the media assets, where the relevance factor indicates a relevance of the media asset to the user. For example, the asset chart service 124 at the media content service 106 determines a relevance factor for each of the media assets 120 that are included in a personalized media chart. The relevance factor for a media asset indicates a relevance of the media asset to the user. In embodiments, the relevance factor for a media asset can be determined based on a personal context of the media asset to the user, such as determined from user preferences, a history of media asset selections, or media asset metadata. Alternatively or in addition, the relevance factor for a media asset can be determined based on a social context of the media asset to social contacts that are associated with the user, such as a group of friends of the user.

At block 406, a chart rank adjustment is calculated for each of the media assets based on the relevance factors for each of the media assets. For example, the asset chart service 124 at the media content service 106 calculates a chart rank adjustment for each of the media assets based on the relevance factors for each of the media assets. A chart rank adjustment 134 for a media asset 120 can be an increase based on the relevance factor that corresponds to the media asset, or a chart rank adjustment 134 can be a decrease based on the relevance factor that corresponds to the media asset.

At block 408, the media assets in the personalized media chart are reordered according to the chart rank adjustments for each of the media assets. For example, the asset chart service 124 at the media content service 106 reorders the media assets in the personalized media chart 212 according to the chart rank adjustments 134 for each of the media assets. At block 410, the personalized media chart is communicated to the user via the requesting client device. For example, the media content service 106 then communicates the personalized media chart 212 to the requesting client device 102, where the media chart application 152 receives the personalized media chart 154.

Figure 5:
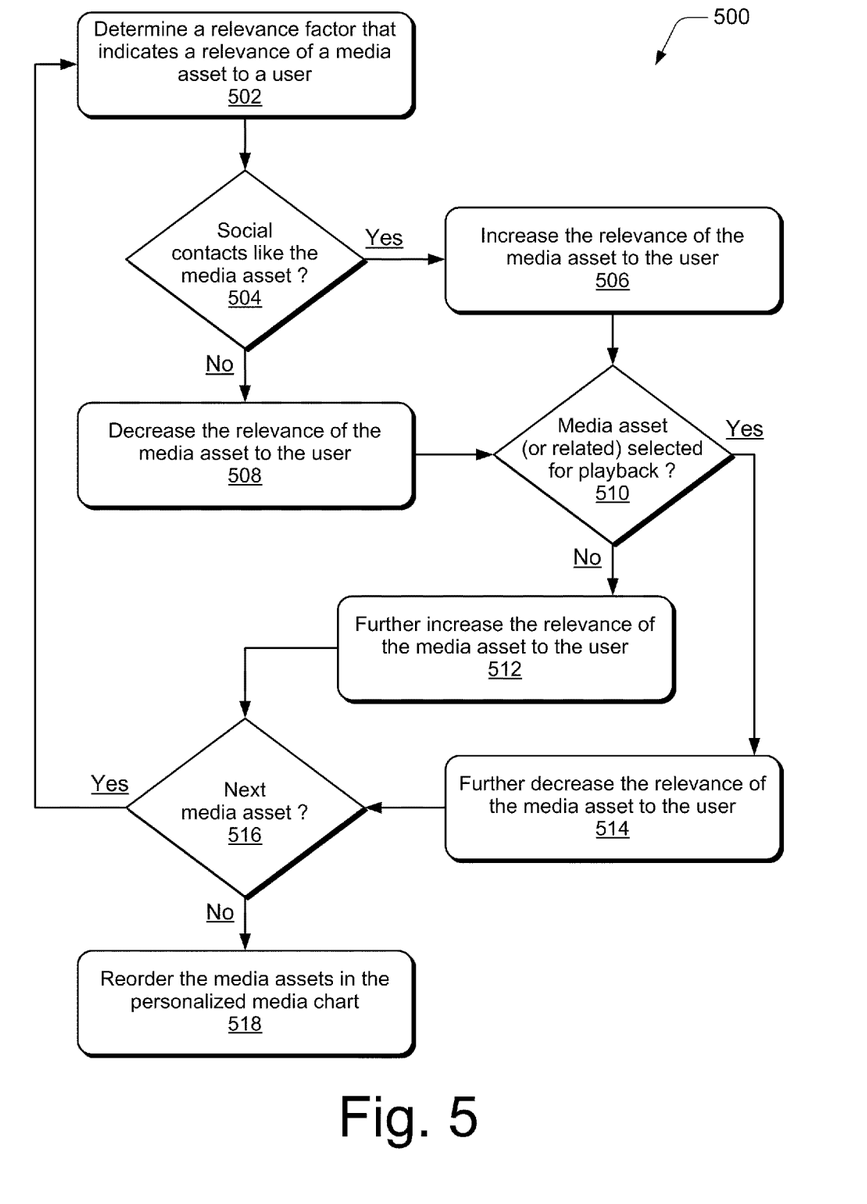
FIG. 5 illustrates additional example method(s) of personalized media charts in accordance with one or more embodiments.

FIG. 5 illustrates example method(s) 500 of personalized media charts. The order in which the method blocks are described are not intended to be construed as a limitation, and any number of the described method blocks can be combined in any order to implement a method, or an alternate method.

At block 502, a relevance factor is determined that indicates a relevance of a media asset to a user. As described with reference to block 404 above, the asset chart service 124 at the media content service 106 determines a relevance factor for each of the media assets 120 that are included in a personalized media chart, and the relevance factor for a media asset indicates a relevance of the media asset to the user. In embodiments, the relevance factor for a media asset can be determined based on a social context of the media asset to social contacts that are associated with the user, such as a group of friends of the user.

At block 504, a determination is made as to whether the social contacts that are associated with the user have indicated liking the media asset. If the social contacts do like the media asset (i.e., "yes" from block 504), then at block 506, the relevance of the media asset to the user is increased. For example, media asset #4 in the personalized media chart 212 is determined to have more social relevance to the user and is moved up in the chart to reflect the increased relevance to the user. If the social contacts that are associated with the user have indicated a dislike for the media asset, or related media assets (i.e., "no" from block 504), then at block 508, the relevance of the media asset to the user is decreased. For example, media asset #2 in the personalized media chart 212 is determined to have less social relevance to the user and is moved down in the chart to reflect the decreased relevance to the user.

In this example, the method continues at block 510 from either of the method blocks 506 or 508. At block 510, a determination is made as to whether the media asset, or a related media asset, has been selected for playback by the user. For example, the user may have already selected a particular media asset, such as to watch a movie or listen to a music track. If the user has not selected the media asset, or a related media asset, for playback (i.e., "no" from block 510), then at block 512, the relevance of the media asset to the user is further increased. For example, the user may not yet have seen, or even heard of a particular movie, and if the group of friends liked the movie, then the relevance to the user may be further increased. If the user has selected the media asset, or a related media asset, for playback (i.e., "yes" from block 510), then at block 514, the relevance of the media asset to the user is further decreased. For example, the user may have already selected the movie to watch (e.g., downloaded the movie for viewing), or the user may have watched a similar or related movie and indicated a dislike for the particular genre of movies.

In this example, the method then continues at block 516 from either of the method blocks 512 or 514. At block 516, a determination is made as to whether the relevance factor of a next media asset in the personalized media chart is to be determined. If another media asset is to be evaluated (i.e., "yes" from block 516), then the method continues at block 502 to determine the relevance factor of the next media asset. If all of the media assets in the personalized media chart have been evaluated (i.e., "no" from block 516), then at block 518, the media assets are reordered in the personalized media chart. As described with reference to block 408 above, the asset chart service 124 at the media content service 106 reorders the media assets in the personalized media chart 212 according to the chart rank adjustments 134 for each of the media assets.

Figure 6:
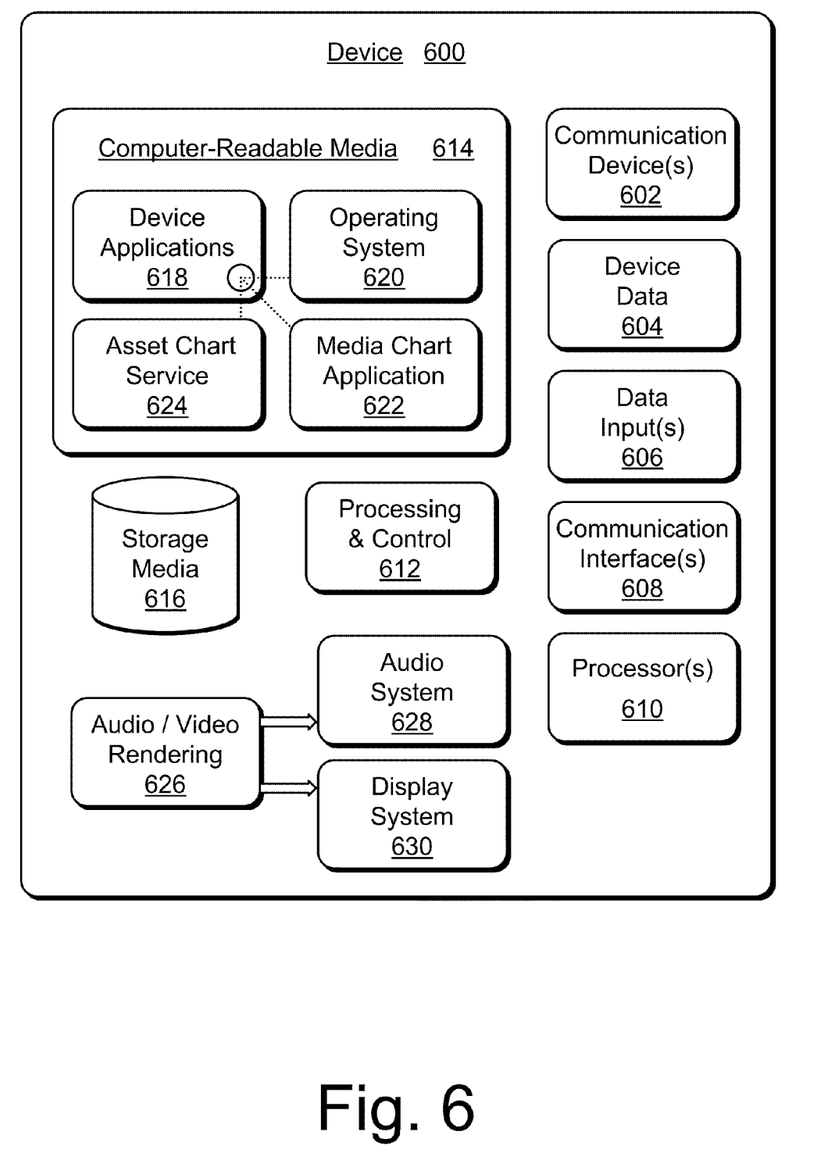
FIG. 6 illustrates various components of an example device that can implement embodiments of personalized media charts.

FIG. 6 illustrates various components of an example device 600 that can be implemented as any type of client, server, and/or computing device as described with reference to the previous FIGS. 1-5 to implement embodiments of personalized media charts. In embodiments, device 600 can be implemented as any one or combination of a wired and/or wireless device, as any form of television client device (e.g., television set-top box, digital video recorder (DVR), etc.), consumer device, computer device, server device, portable computer device, user device, communication device, video processing and/or rendering device, appliance device, gaming device, electronic device, and/or as any other type of device. Device 600 may also be associated with a user (i.e., a person) and/or an entity that operates the device such that a device describes logical devices that include users, software, firmware, and/or a combination of devices.

Device 600 includes communication devices 602 that enable wired and/or wireless communication of device data 604 (e.g., received data, data that is being received, data scheduled for broadcast, data packets of the data, etc.). The device data 604 or other device content can include configuration settings of the device, media content stored on the device, and/or information associated with a user of the device. Media content stored on device 600 can include any type of audio, video, and/or image data. Device 600 includes one or more data inputs 606 via which any type of data, media content, and/or inputs can be received, such as user-selectable inputs, messages, music, television media content, recorded video content, and any other type of audio, video, and/or image data received from any content and/or data source.

Device 600 also includes communication interfaces 608 that can be implemented as any one or more of a serial and/or parallel interface, a wireless interface, any type of network interface, a modem, and as any other type of communication interface. The communication interfaces 608 provide a connection and/or communication links between device 600 and a communication network by which other electronic, computing, and communication devices communicate data with device 600.

Device 600 includes one or more processors 610 (e.g., any of microprocessors, controllers, and the like) which process various computer-executable instructions to control the operation of device 600 and to implement embodiments of personalized media charts. Alternatively or in addition, device 600 can be implemented with any one or combination of hardware, firmware, or fixed logic circuitry that is implemented in connection with processing and control circuits which are generally identified at 612. Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 600 also includes computer-readable storage media 614, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 600 can also include a mass storage media device 616.

Computer-readable storage media 614 provides data storage mechanisms to store the device data 604, as well as various device applications 618 and any other types of information and/or data related to operational aspects of device 600. For example, an operating system 620 can be maintained as a computer application with the computer-readable storage media 614 and executed on processors 610. The device applications 618 may include a device manager, such as any form of a control application, software application, signal processing and control module, code that is native to a particular device, a hardware abstraction layer for a particular device, and so on.

The device applications 618 also include any system components or modules to implement embodiments of personalized media charts. In this example, the device applications 618 can include a media chart application 622, such as when device 600 is implemented as a client device. Alternatively or in addition, the device applications 618 can include an asset chart service 624, such as when device 600 is implemented as a media content service. The media chart application 622 and the asset chart service 624 are shown as software modules and/or computer applications. Alternatively or in addition, the media chart application 622 and/or the asset chart service 624 can be implemented as hardware, software, firmware, or any combination thereof.

Device 600 also includes an audio and/or video rendering system 626 that generates and provides audio data to an audio system 628 and/or generates and provides display data to a display system 630. The audio system 628 and/or the display system 630 can include any devices that process, display, and/or otherwise render audio, display, and image data. Display data and audio signals can be communicated from device 600 to an audio device and/or to a display device via an RF (radio frequency) link, S-video link, composite video link, component video link, DVI (digital video interface), analog audio connection, or other similar communication link. In an embodiment, the audio system 628 and/or the display system 630 are implemented as external components to device 600. Alternatively, the audio system 628 and/or the display system 630 are implemented as integrated components of example device 600.

Although embodiments of personalized media charts have been described in language specific to features and/or methods, it is to be understood that the subject of the appended claims is not necessarily limited to the specific features or methods described. Rather, the specific features and methods are disclosed as example implementations of personalized media charts.

The invention claimed is:

1. A computer-implemented method, comprising:
receiving a request for a personalized media chart that lists media assets as recommendations in a relevant order for a user, the media assets initially ordered in the personalized media chart according to a chart rank for each media asset;
determining relevance factors for a media asset, the relevance factors for the media asset indicating a relevance of the media asset to the user and including a relevance factor based at least in part on a user history and preferences;
calculating a personal chart rank adjustment for the media asset based at least in part on the relevance factor of the media asset that is based at least in part on the user history and preferences;
reordering the media asset in the personalized media chart according to the personal chart rank adjustment for the media asset;
after said reordering the media asset according to the personal chart rank adjustment, calculating a social chart rank adjustment for the media asset based at least in part on a social context of the media asset to social contacts that are associated with the user; and
after said reordering the media asset according to the personal chart rank adjustment, reordering the media asset in the personalized media chart according to the social chart rank adjustment for the media asset.

2. A computer-implemented method as recited in claim 1, wherein the personal chart rank adjustment for the media asset is an increase based at least in part on the relevance factors that correspond to the media asset.

3. A computer-implemented method as recited in claim 1, wherein the personal chart rank adjustment for the media asset is a decrease based at least in part on the relevance factors that correspond to the media asset.

4. A computer-implemented method as recited in claim 1, wherein said calculating the personal chart rank adjustment is based at least in part on a personal context of the media asset to the user.

5. A computer-implemented method as recited in claim 4, wherein the personal context of the media asset to the user is determined from at least one of a history of media asset selections or media asset metadata.

6. A computer-implemented method as recited in claim 1, wherein the social contacts that are associated with the user have indicated a dislike for the media asset which decreases the relevance of the media asset to the user.

7. A computer-implemented method as recited in claim 1, wherein the social contacts that are associated with the user have indicated liking the media asset which increases the relevance of the media asset to the user.

8. A computer-implemented method as recited in claim 7, wherein the user has not selected the media asset for playback which further increases the relevance of the media asset to the user.

9. A computer-implemented method as recited in claim 7, wherein the user has selected a related media asset for playback which decreases the relevance of the media asset to the user.

10. A system, comprising:
a media content service configured to receive a request for a personalized media chart that lists media assets as recommendations in a relevant order for a user, the media assets initially ordered in the personalized media chart according to a chart rank for each media asset;
at least a memory and a processor to implement an asset chart service configured to:
- determine relevance factors for a media asset, the relevance factors for the media asset indicating a relevance of the media asset to the user including a relevance factor based at least in part on whether the user has not selected the media asset for playback;
- calculate a chart rank adjustment for the media asset based at least in part on the relevance factors of the media asset;
- increase the chart rank adjustment for the media asset based at least in part on the relevance factor indicating that the user has not selected the media asset for playback; and
- reorder the media asset in the personalized media chart according to the chart rank adjustment for the media asset.

11. A system as recited in claim 10, wherein the personal chart rank adjustment for the media asset is at least one of an increase or a decrease based at least in part on the relevance factors that correspond to the media asset.

12. A system as recited in claim 10, wherein the relevance factors for the media asset are determined based on at least in part on a personal context of the media asset to the user.

13. A system as recited in claim 10, wherein the social contacts that are associated with the user have indicated a dislike for the media asset which decreases the relevance of the media asset to the user.

14. A system as recited in claim 10, wherein the social contacts that are associated with the user have indicated liking the media asset which increases the relevance of the media asset to the user.

15. A system as recited in claim 14, wherein the user has selected a related media asset for playback which decreases the relevance of the media asset to the user.

16. Computer-readable storage media devices comprising instructions that are executable and, responsive to executing the instructions, a computer device:
- receives a request for a personalized media chart that lists media assets as recommendations in a relevant order for a user, the media assets initially ordered in the personalized media chart according to a chart rank for each media asset;
- determines relevance factors for a media asset, the relevance factors for a media asset indicating a relevance of the media asset to the user including a relevance factor based at least in part on whether the user has not selected the media asset for playback;
- calculates a chart rank adjustment for the media asset based at least in part on the relevance factors for the media asset;
- increases the chart rank adjustment for the media asset based at least in part on the relevance factor indicating that the user has not selected the media asset for playback; and
- reorders the media asset in the personalized media chart according to the chart rank adjustment for the media asset.

17. Computer-readable storage media devices as recited in claim 16, further comprising additional instructions that are executable and, responsive to executing the additional instructions, the computer device calculates the chart rank adjustment for the media asset as at least one of an increase or a decrease based at least in part on the relevance factors that corresponds to the media asset.

18. Computer-readable storage media devices as recited in claim 16, further comprising additional instructions that are executable and, responsive to executing the additional instructions, the computer device determines the relevance factors for the media asset based at least in part on a personal context of the media asset to the user including at least one of a history of media asset selections or media asset metadata.

19. Computer-readable storage media devices as recited in claim 16, further comprising additional instructions that are executable and, responsive to executing the additional instructions, the computer device decreases the chart rank adjustment for at least one of the media assets based at least in part on the relevance factor indicating that the user has selected the one of the media assets for playback.

20. A system as recited in claim 10, wherein the relevance factors for the media asset further include a relevance factor based at least in part on a user history and preferences, and the asset chart service is further configured to:
- calculate a personal chart rank adjustment for the media asset based at least in part on the relevance factor of the media asset that is based at least in part on the user history and preferences;
- reorder the media asset in the personalized media chart according to the personal chart rank adjustment for the media asset;
- after the media asset is reordered according to the personal chart rank adjustment, calculate a social chart rank adjustment for the media asset based at least in part on a social context of the media asset to social contacts that are associated with the user; and
- reorder the media asset in the personalized media chart according to the social chart rank adjustment for the media asset.

* * * * *